May 8, 1934. J. F. HOFFMAN 1,958,087
AUTOMATIC CONTROL FOR REFRIGERATION SYSTEMS
Filed April 5, 1930 3 Sheets-Sheet 2
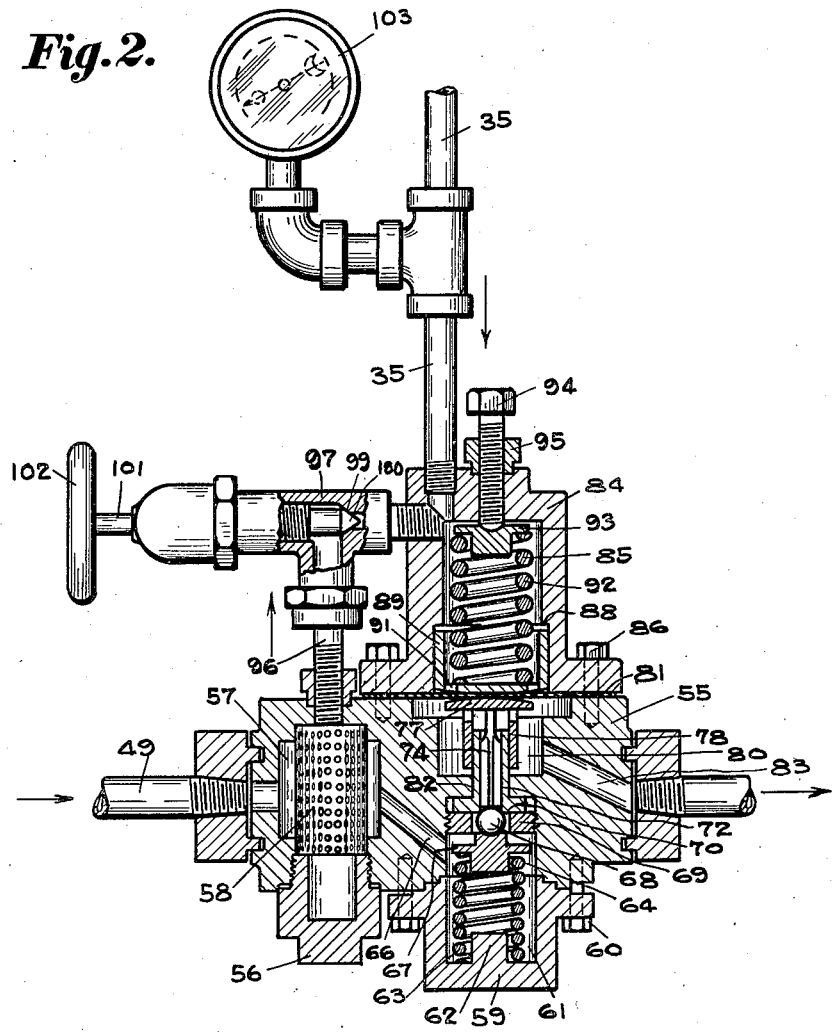
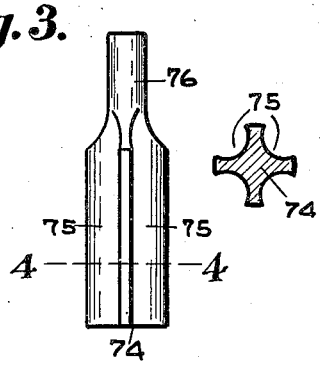
Inventor
J.F.Hoffman
By Arthur H. Sturges
Attorney May 8, 1934.  J. F. HOFFMAN  1,958,087
AUTOMATIC CONTROL FOR REFRIGERATION SYSTEMS
Filed April 5, 1930  3 Sheets-Sheet 3
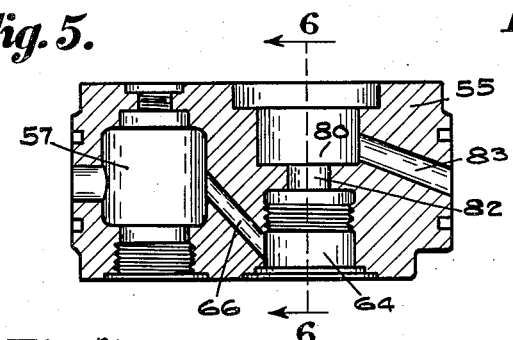
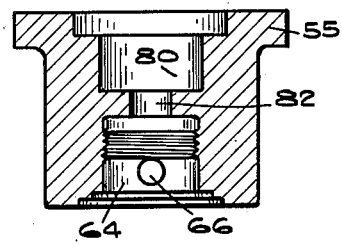
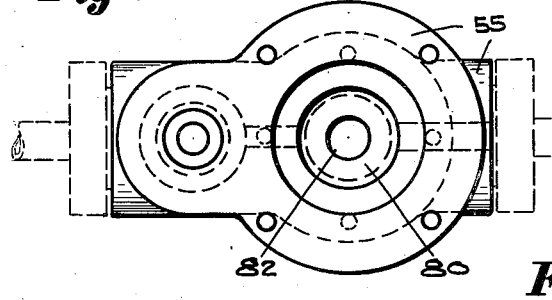
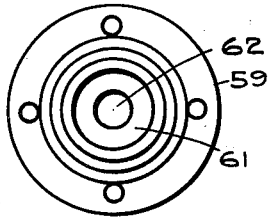
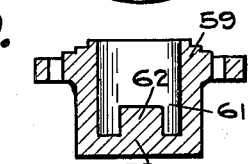
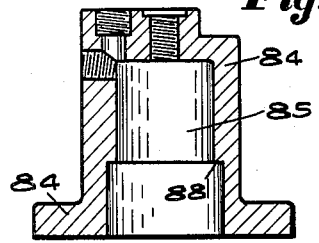
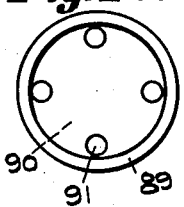
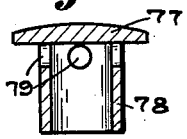
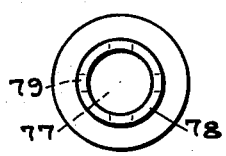
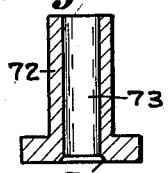
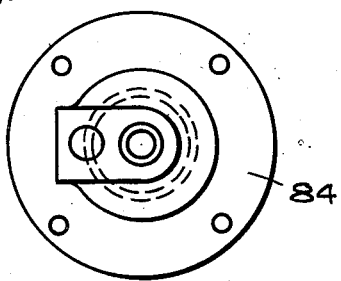
Inventor
J. F. Hoffman
By Arthur H. Sturges
Attorney Patented May 8, 1934

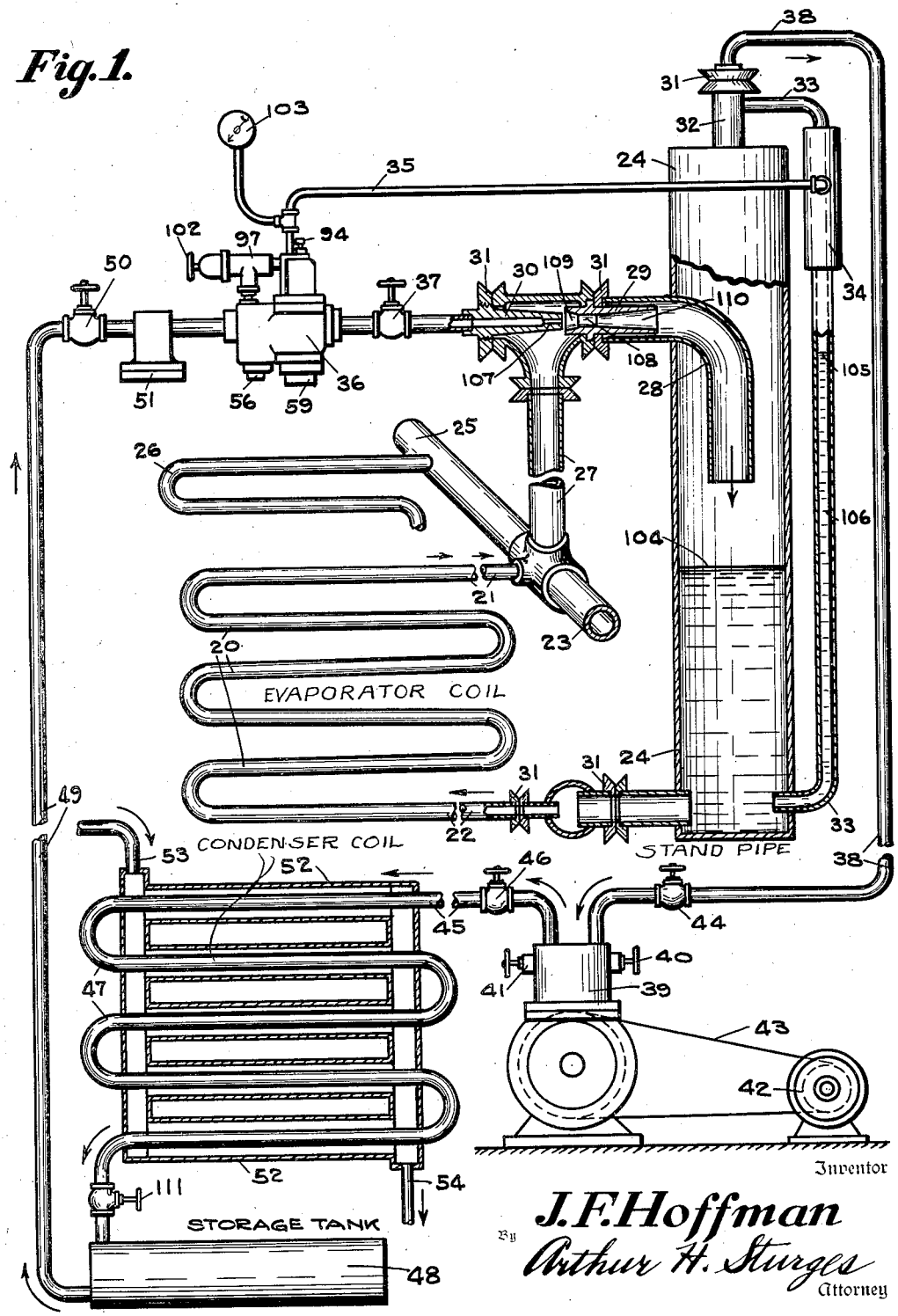

1,958,087

UNITED STATES PATENT OFFICE 1,958,087

AUTOMATIC CONTROL FOR REFRIGERATION SYSTEMS

John F. Hoffman, Omaha, Nebr., assignor to Baker Ice Machine Company, Inc., Omaha, Nebr., a corporation of Nebraska Application April 5, 1930, Serial No. 441,863

1 Claim. (Cl. 62—8)

The present invention relates to the art of refrigeration, and has particular reference to an automatic control for refrigeration systems.

A primary object of the present invention is to provide means and a method wherein the flow of a liquid refrigerant through an evaporating coil may be thermostatically controlled and regulated to remove the insulating film of gas bubbles which normally clings to the interior walls of the coil and to thermostatically maintain a desired liquid level substantially constant.

A further object of the invention is to provide automatic means for regulating a refrigeration system whereby upon sudden changes of temperature affecting the several parts thereof, the automatic means will rectify the temperature condition of the system and restore the latter to a normal, selected and predetermined temperature.

Another object of the invention is to provide means for cooling the refrigerant by mingling it with the thermo-siphoned refrigerant drawn from an evaporator coil whereby the gases of pre-cooling the liquid refrigerant, expanding through the injector, are permitted to flow directly to a compressor; thereby eliminating the use of extra pre-cooling devices and the cost thereof, such as have heretofore been utilized in the art.

Other and further objects and advantages of this invention will be understood from the following detailed description, reference being had to the accompanying drawings in which:

Figure 1 is an elevation of a refrigeration system, showing the improved automatic refrigeration features of this invention applied thereto, certain parts thereof being broken away and shown in section.

Figure 2 is a detail vertical section enlarged of a main valve employed.

Figure 3 is a detail side elevation of a plunger rod used in the valve of Figure 2.

Figure 4 is a transverse section taken through the rod shown in Figure 3, substantially along the dotted line 4—4.

Figure 5 is a detail section taken vertically through the body portion of the valve of Figure 2.

Figure 6 is a transverse section taken through the same, substantially on the line 6—6 of Figure 5.

Figure 7 is a top plan view of the body portion of the valve.

Figure 8 is a top plan view of the lower cap for the valve body.

Figure 9 is a transverse section through the same.

Figure 10 is a transverse section of the upper cap of the valve.

Figure 11 is a top plan view of the same.

Figure 12 is a transverse section taken through the upper sleeve of the valve.

Figure 13 is a top plan view of the same.

Figure 14 is a longitudinal section of the lower sleeve of the valve.

Figure 15 is a lower end view thereof.

Figure 16 is an upper end view of the guide sleeve of the valve, and

Figure 17 is a longitudinal section therethrough.

Referring now to the drawings for a more particular description, and in which like numerals designate like or corresponding parts throughout the several views, 20 indicates an evaporator coil adapted to be placed in a brine tank or hung upon the wall of a room and provided with an outlet 21 and an inet 22 which are in communication, respectively, with a line pipe 23 or header and a stand tank or separating chamber 24.

The header 23 may be of any selected length as indicated at 25 and any desired number of coils, such as the coil 26, may be also placed in communication with the header 23 and the separating chamber 24.

The header pipe 23 is in communication with a riser 27 and may be formed integral herewith. The header and the riser are of greater diameter or cross sectional area than the outlet 21 of either of the coils 20 or 26.

The riser 27 opens into one end of an elongated elbow 28, which opens at its other end downwardly into the interior of the separating chamber 24. The upper end of the elbow 28 is provided with a Venturi tube 29 and an inspirator or thermo-siphon 30, the latter being in communication with later described devices.

For convenience of assembly and connection, the heretofore mentioned parts may be secured together by numerous pipe unions 31 or the like.

A nipple 32 rises from the top of the separating chamber 24. A thermal pipe 33 is connected at its lower end to the separating chamber 24 adjacent the bottom thereof, and at its upper end opens into the nipple 32 for purposes later described.

A thermo-element jacket 34 encircles the thermal pipe 33 preferably adjacent its upper end and is sealed thereabout and communicates with a pipe 35 leading to a diaphragm controlled valve 36. The valve 36 is in communication with the thermo-siphon inspirator 30 through a cut-off cock 37. The nipple 32, which forms a continuation of the separating chamber 24, is connected to a pipe 38 leading to the intake side of a compressor 39.

The compressor 39 may be of any conventional type and is provided with a cut-off valve 40 adjacent its intake side and a similar valve 41 adjacent its output side. The compressor 39 is preferably driven by a motor 42 through a driving belt 43. It will be understood that the motor 42 may be in the form of an electric motor.

A cut-off cock 44 is provided in the pipe 38.

The compressor 39 has an outlet pipe 45, provided with a cut-off cock 46, and opening into one end of a condenser coil 47 which leads to a reservoir or storage tank 48 from which extends a pipe 49 provided with a cut-off cock 50 and a scale trap 51 beyond the valve 50, and which is connected to the valve 36.

The condenser coil 47 is provided with a water jacket 52 which has an inlet pipe 53 leading from a source of water supply, such as the city water, and an outlet pipe 54 which discharges into a waste or sewer, not shown.

Referring now to Figure 2, the main body portion 55 (shown in Figures 5, 6 and 7) of the valve 36 is provided with a clean-out plug 56 threaded in the bottom near one end of the body 55 to close a chamber 57 therein and may be removed for the purpose of withdrawing from the chamber, for cleaning purposes, a perforated screen 58 preventing small particles of pipe scale from entering the passages in the valve 36.

A fluid refrigerant, such as ammonia or methol chloride, is adapted to enter the chamber 57 through the pipe 49, and such refrigerant is adapted to be strained through the screen 58, if desired, before passing from the chamber 57 and entering the latter described valve parts. A cut-off web, not shown, may be provided, if desired, for preventing the passage of the refrigerant directly from the pipe 49 to the passage way 66.

A lower removable cap 59, shown in detail in Figures 8 and 9, is attached to the body portion 55 of the valve by means of cap screws 60.

The lower cap 59 is provided with a recess 61 and a central up-standing annular shoulder 62 which is adapted to position an expanding spring 63 centrally of the recess 61.

The body portion 55 of the valve is provided with a lower recess 64 which, in conjunction with the recess 61 of the lower cap, forms a chamber in the body 55 when the lower cap is assembled upon the main body portion. The chamber 64 is in communication with the chamber 57 through a passage way or duct 66.

The lower spring 63 carries a flanged disc 67 on its upper end and is adapted to normally urge said disc upwardly. The disc 67 is provided with a dished or concaved upper end opposite to the spring 63, and a steel ball 68 is carried in the dished portion of the disc 67.

A threaded nut 69, of less thickness than the diameter of the ball 68, is provided with a central opening 70 which is of greater diameter than that of the ball 68 to admit free flow of the refrigerant thereabout when the ball is unseated.

The ball 68 is adapted to register against a seat 71 formed on a flanged sleeve 72 (Figures 16 and 17), and the sleeve 72 may be removed for valve seat grinding or replacement purposes by removing the lower cap 59 and the nut 69. The sleeve 72 is provided with a central bore or aperture 73.

A pusher pin 74 is mounted in the bore 73 of the sleeve 65. The lower end of the pusher pin 74 rests upon the ball 68 and, as best shown in Figures 3 and 4, the pusher pin 74 is cruciform in cross section providing elongated slots 75 through which the refrigerant may pass under control of the valve.

The smaller or upper end 76 of the pusher pin 74 is adapted to bear against the cover 77 of a sleeve 78, said sleeve being shown in detail in Figures 14 and 15, and as there illustrated it will be noted that the sleeve and cover cap are integral and provided with apertures 79 through which the refrigerant may pass. The length of the annular wall of the sleeve 78 is slightly less than the height of the annular wall of an upper recess 80 whereby the end of the sleeve 78 will be limited in its downward movement by contact with the bottom of the recess 80.

The cover cap 77 of the sleeve 78 is adapted to bear against a diaphragm 81 comprising a disc of thin metal. The sleeve 78 slidably engages upon the flanged sleeve 72 within which the pusher pin is slidably supported. It will also be noted that the sleeve 78 is housed within an upper recess 80 and that a bore 82 is provided between the upper recess 80 and the lower recess 64 of the valve body 55 and that the flanged sleeve 72 is snugly fitted and journaled within and through said bore 82.

By the foregoing described means and mechanism, the liquid refrigerant is adapted to pass into and through the valve 36 from the pipe 49 to the upper recess 80 thereof and enter the inspirator or thermo-siphon 30 at times when said valve is opened by means and mechanism now to be described.

The diaphragm 81 is adapted to be moved downwardly to open the ball valve 68 through the cover cap 77, which is in contact with the diaphragm at all times, and it will be understood that a downward movement of the diaphragm and cover cap 77 will cause the pusher pin or needle 74 to move the ball 68 downwardly against the force of the spring 63 and away from its seat 71 on the flanged sleeve 72, permitting the refrigerant to pass by the ball and its seat.

The ball is normally seated, normally cutting off the passage of refrigerant from the duct 66 to the upper recess 80. It will be noted that the upper side of the cover cap 77 of the sleeve 78 is of convex contour.

An upper cap 84, best shown in Figures 10 and 11, is provided with a chamber 85 and is secured to the main body portion 55 of the valve 36 by means of cap screws 86, and when so secured the chamber 85 is closed and cut off from the main body portion of the valve by means of the intervening diaphragm 81 and communication is established only through a needle valve and during adjustment times as later described.

An annular interior shoulder 88 is formed upon the interior wall of the upper cap which is adapted to limit the movement upwardly away from the diaphragm of an upper sleeve 89, shown in detail in Figures 12 and 13, said sleeve 89 provided with a convex bottom wall 90 which is similar in contour to the cap 77 of the lower sleeve 78.

The central portion of the bottom 90 is adapted to bear upon the diaphragm 81 directly opposite to the central portion of the cover cap 77 of the lower sleeve 78.

The upper sleeve 89 is provided with a plurality of apertures 91 through the bottom thereof for permitting a gaseous element, later described, to freely register with the upper side of the diaphragm 81.

The upper sleeve 89 is normally urged against the diaphragm 81 by means of an upper spring 92 which is carried within the upper sleeve 89 and between the latter and a flanged upper disc 93, the latter being in register with a set screw 94 utilized for adjusting the tension of the upper spring 92, said screw being threaded through the top of the cap 84 and when the spring 92 is suitably adjusted the said adjustment is adapted to be maintained by means of a jamb or lock nut 95 carried by the screw 94 and adapted to bear upon the upper cap 84.

The heretofore mentioned chamber 57 containing the strainer 58 is adapted to be in communication, at times, with the upper chamber 85 through a by-pass pipe 96 which, as shown in Figure 2, is provided with a needle valve 97 now to be described.

The needle valve comprises a housing which is provided with an interior seat 99 upon which the beveled end 100 of the needle shaft 101 is adapted to bear and register.

The needle shaft 101 is threadedly received within the housing and provided with a hand wheel 102, which by manual operation is adapted to open and close the needle valve for permitting communication between the chambers 57 and 85.

The heretofore mentioned pipe 35 is adapted to permit communication between the thermo-element jacket 34 carried by the thermal pipe 33 and the upper chamber 85 of the valve 36, and it will be noted that communication is also permitted between the pipe 35 and the strainer chamber 57 at times when the needle valve 97 is open.

The pipe 35 is provided with a gauge 103 for purposes later described.

In order to place the apparatus of the system in condition for the later herein described operation, the reservoir or storage tank 48 is first filled with an amount of liquid refrigerant adequate for the accommodation of all parts of the system and the cut-off cocks 46 and 50 closed, thereby sealing the refrigerant or ammonia between said cocks, and within the condenser coil 47 and said tank 48. A cut-off cock 111 is installed between the condenser coil 47 and the tank 48.

The next step is to evacuate the remainder of the system between the scale trap 51 and the compressor 39, the latter being utilized for pumping the air out of the said remaining parts by a manipulation of the compressor valves 40 and 41 and the opening of valves 97, 37 and 44, and the closing of valves 46 and 50. The suction through the pipe 33 and separating chamber 24 is transmitted through the elbow 28 and valve 37 to the chamber 80. The diaphragm 81 is now drawn down to slide the pusher pin 74 and unseat the ball 68 so that the suction pressure is transmitted through passage 66 to chamber 57, valve 97 and pipe 35 to thermo-phore jacket 34.

The next step is to ascertain that the desired parts have been evacuated to a sufficient extent by noting the degree of evacuation indicated by the dial of the gauge 103.

The next step is to close the valve 44 and similarly open the valve 50, thereby permitting refrigerant to pass through the valves 36 and 37 into the separating chamber 24. Also on account of the thermo-element jacket 34, pipe 35 and the upper chamber 85 having been evacuated, the refrigerant begins to fill the said parts and is permitted to do so until the gauge 103 indicates the desired pressure, such as substantially 100 pounds; whereupon the needle valve 97 is closed, thereby sealing the trapped refrigerant within the parts 34, 35 and 85 for effecting the movements of the diaphragm 81 as later described.

It will be understood that the ammonia from the tank 48 is at a pressure of substantially 185 pounds and that on account of said pressure the separating chamber 24 and evaporator coils 20 and 26 will become filled to an extent sufficient for starting the later herein described operation.

The next step is to adjust the tension of the upper spring 92 for governing the flow of refrigerant past the ball valve 68 which is consummated by means of the set screw 94 which, if turned in a counter clock-wise direction, will adjust the ball valve 68 so that a lesser quantity of refrigerant will pass the ball valve 68 than will be permitted when the screw 94 is turned clockwise and the spring 92 of a greater expansive force.

The spring 92 after being adjusted remains a constant factor which in conjunction with the pressure exerted upon the diaphragm 81 by means of the expansive force of the refrigerant sealed within the chamber 85 affects and governs the movement of the diaphragm for opening and closing the ball valve 68 for the purpose of regulating the flow of refrigerant past said valve, the expansive force of the refrigerant within the chamber 85 being varied by the contraction and expansion thereof caused by changes in the temperature of the said sealed refrigerant by changes of temperature communicated to the thermo-element jacket 34 by a means later described.

As the system fills with refrigerant from the tank 48 a cooling of the thermo-element jacket 34 will be caused, thereby effecting the diaphragm 81 to stop the flow of refrigerant through the valve 36 and past the ball 68 therein during which period the set screw 94 may be adjusted for regulating the extent of flow to the desired degree.

Assuming that all parts of the invention and apparatus have been installed and adjusted as heretofore described; that the normal level of the liquid refrigerant within the separating chamber 24 is substantially as indicated at 104; that a normal selected temperature of 15 degrees is within the system; and that the normal level of the refrigerant within the thermal pipe 33 is as indicated at 105 or at higher level than 104 on account of the difference in cross sectional area between the separating chamber 24 and the pipe 33, thus permitting a greater volume of liquid refrigerant to be retained in the standpipe 24 as compared to the pipe 33 and with the result that the greater volume of said liquid will be more solid than the lesser volume containing bubbles which will, therefore, ascend to a greater height as at 105. Thus in pipe 33 where the area is smaller the bubbles will ascend higher; whereas in the greater area as at 104 the bubbles will spread over said greater area and thus be at a lower level.

The liquid refrigerant upon entering the separating chamber 24 from the elbow 28 will be in the form of a gaseous mixture of greater or less density in accordance with conditions, as later mentioned, and will settle by gravity to the bottom of the separating chamber 24, the gas vapors thereof will ascend and leave the chamber 24 through the pipe 38 and pass to the compressor 39, the latter pumping the gas by suction from the pipe 38 and top of chamber 24.

As the liquid refrigerant within the separating chamber 24 alters its level, on acount of the hotter gas separating therefrom and moving to the compressor 39, it will consequently shrink in cubical bulk and cause a corresponding lowering of the level of the refrigerant within the thermal pipe 33 to a level such as indicated at 106, or thereabout, and cause the temperature of the refrigerant within the thermo-element jacket 34 to alter its level and expand and transmit through the pipe 35 an increased pressure upon the diaphragm 81 and cause the latter to move downwardly towards the ball 68 against the tension of the lower spring 63 of the valve 36 and permit the flow of the liquid refrigerant through the valve 36 towards the separating chamber 24.

When the refrigerant within the separating chamber 24 becomes altered in level, through an action later described, it will expand and cause the refrigerant within the pipe 33 to rise and approach the thermo-element jacket 34 which will lower the temperature of the refrigerant sealed within said jacket, causing said sealed refrigerant to contract, thereby diminishing the pressure within the members 34, 35 and the chamber 85 of the valve 36, and when so diminished the diaphragm 81 will move upwardly and permit the spring 63 to jamb the ball 68 firmly against its seat and cut off the passage of refrigerant through the valve 36 from the separating chamber 24.

As thus described it will be understood that the thermic changes within the thermo-element jacket 34 are adapted to regulate or to totally prevent the passage of refrigerant through the valve 36 for purposes now to be described.

The fluid gas upon entering the compressor 39 from the pipe 38 is transformed into vapor and is raised in temperature by compression. The said compression part of the operation, as well as the cooling of the vapor by means of the condenser coil 47 to transform the vapor into a liquid received within the tank or reservoir 48, is well-known.

It will be understood that the liquid refrigerant from the tank 48 is forced forwardly through the valve 36, at permitted times, on account of the pressure thereof which upon leaving the tank 48 is of substantially 170 pounds per square inch, assuming that the temperature of the water in the jacket 52 of the coil 47 is substantially 85 degrees.

The liquid refrigerant, at its condensible pressure, is admitted past the ball 68 of the valve 36 in ample quantity to supply the refrigerating capacity of the system and in a quantity as demanded or governed by the actuation of the thermostatic control comprising the thermo-element jacket 34 upon the thermal pipe 33 operating through changes of temperature and consequent changes of pressure upon the diaphragm 81 for opening and closing the valve 36.

At times when the valve 36 is opened, the liquid refrigerant passing therethrough enters the restricted bore 107 at the outer end of the thermo-siphon inspirator 30 whereby, upon leaving the latter, it is increased in velocity before entering the Venturi tube 29, the latter being provided with a central restricted bore 108, a flared conical end 109, adjacent the inspirator, and an elongated nozzle 110.

The well known action of a Venturi tube, in conjunction with the high velocity of the refrigerant entering said tube, creates a suction upon the exhausted and bubble laden refrigerant within the riser 27 causing the said exhausted refrigerant to move upwardly, by suction, and be siphoned from the riser 27 and from the coil 20, the said exhausted refrigerant, containing the heat of evaporation suspended throughout the refrigerant, upon entering the Venturi tube 29 will commingle with the liquid refrigerant entering from the thermo-siphon inspirator 30 and the mingled refrigerants will discharge into the separating chamber 24 through the down turned elbow 28, where the refrigerant settles, by gravity, to the bottom of the chamber 24 and the freed hotter separated gas moves to the top thereof for transmission again to the compressor 39 as heretofore described.

By this means an automatic circulation of refrigerant through the coil 20 is provided, the moved refrigerant carrying off and removing from the interior walls of the evaporator coil 20 the film of insulating gas bubbles which would otherwise cling to said walls and prevent the transfer of a cooler temperature, through said coil, to the brine within which the coil 20 may be placed for commercial purposes, such as ice making, and thereby effecting the temperature exchanged between the brine and the cooling agent; thus permitting the ammonia, freed from gas bubbles, to directly contact with the interior wall of the coil 20.

When the temperature within the thermo-element jacket 34 is lowered the valve 36 will close thereby preventing the siphoning of refrigerant from the coil 20 and the further rising of the liquid level in tank 24, and when the temperature in said jacket is raised siphoning is permitted and a rising of liquid level occurs in tank 24.

It is understood that the temperature of the refrigerant at the level 106 within the thermal pipe 33 corresponds to the pressure or temperature of the refrigerant within the evaporator coil 20 which would be at substantially 15 pounds pressure when the temperature of the refrigerant within the coil 20 is at zero.

Should the level of the refrigerant rise to the point indicated at 105, there would consequently be a change in temperature of the refrigerant at the level 105, which may be as much as twenty degrees different between the levels 106 and 105, the temperature at the latter being colder at such time.

Accordingly, it will be noted that the temperature of the refrigerant within the pipe 35 or thermo-element jacket 34 varies according to the level of the refrigerant with the thermal pipe 33, the refrigerant at the level 106 will be in the form of a liquid and in the form of a superheated gas at 105 in said pipe.

By the foregoing described means, the admission of refrigerants into the separating chamber 24 and the evaporator coil 20 will be synchronized with and governed by the capacity of the other parts of the apparatus or system to handle the gas of evaporation, received from the coil 20, admitted or exhausted to or from the evaporator coil 20, which will thereby cause a cycle of operation and most efficient condition, preparing the gases exhausted from the coil 20 at a predetermined temperature most economical to compressor operations, such desideratum being the most advantageous temperature of the gases before entering the compressor for changing the character of the gas to a compressed vapor prior to the condensation thereof into a liquid.

It will be noted that the desired result is accomplished by the herein described means and method in an automatically regulated and governed manner and without the use of an additional pump for the coil 20 or the power to drive the latter.

Also it will be noted that in instances when the coil 20 is hung upon the wall of a freezer room that upon the opening of a door thereof the said coil will thereby become subjected to a sudden rise in temperature, thereby causing the heretofore mentioned undesired gas bubbles to suddenly form in a greater increased quantity upon the interior wall of the coil. Such sudden change of temperature will cause the refrigerant within the separating chamber 24 to "boil up" and therefore occupy a greater cubical bulk and attendant increase of pressure.

The apparatus will automatically adjust itself to rectify the said change in temperature in the said room and draw the undesired insulating gas bubbles from the walls of the coil through the operation of the automatic regulating means comprising the herein described thermostatically actuated devices for opening or closing the governing valve 36, and increase or diminish the cubical bulk, pressure or volume of the refrigerant within the separating chamber 24 so that said volume will be regulated to suit conditions, and gas solely will be sucked into the compressor to the exclusion of the liquid refrigerant; the latter form being more costly to handle through a compressor as well as injurious to the mechanism thereof and also requiring more power to handle.

It will be noted that by the foregoing described means and method that the cubical bulk of the refrigerant entering the coil 20 will remain substantially constant, thereby maintaining the system at a factor most efficient for economical operation.

While I have herein shown and described one preferred form of my invention by way of illustration I wish it to be understood that I do not limit or confine myself to the precise details of construction herein described and delineated, as modification and variation may be made within the scope of the claim without departing from the spirit of the invention.

What is claimed is:—

In combination with a refrigeration system, an evaporator, an evaporator coil connected thereto and having a header, a riser leading from the header to the upper portion of the evaporator, a pipe leading from the refrigeration system and having an inspirator at the top of said riser, a Venturi tube in said riser opposite the inspirator for creating pressure in the riser and evaporator by liquid under pressure in the system, a controlling valve in said pipe having a diaphragm, a manually adjustable spring operable on the diaphragm to control operation thereof, a by-pass between the upper and lower portion of the evaporator, a closed jacket surrounding the by-pass, a pressure pipe between said jacket and the spring chamber of said controlling valve, and a manually controlled by-pass in said valve between the intake side of said pipe and said spring chamber of the valve for admitting pressure from the system into said pressure pipe whereby the expansion and contraction of the fluid in the pressure pipe and jacket may cooperate with said spring to control the operation of the diaphragm.

JOHN F. HOFFMAN.